(12) United States Patent
Rodger et al.

(10) Patent No.: US 12,173,499 B1
(45) Date of Patent: Dec. 24, 2024

(54) ACOUSTIC INTERLAYER

(71) Applicants: Kenneth James Rodger, Parshall, CO (US); Elisa Donati Rodger, Parshall, CO (US)

(72) Inventors: Kenneth James Rodger, Parshall, CO (US); Elisa Donati Rodger, Parshall, CO (US)

(*) Notice: Subject to any disclaimer, the term of this patent is extended or adjusted under 35 U.S.C. 154(b) by 483 days.

(21) Appl. No.: 16/726,226

(22) Filed: Dec. 23, 2019

Related U.S. Application Data

(60) Provisional application No. 62/784,419, filed on Dec. 22, 2018.

(51) Int. Cl.
*E04B 1/84* (2006.01)
*B32B 27/08* (2006.01)

(52) U.S. Cl.
CPC ............ *E04B 1/8409* (2013.01); *B32B 27/08* (2013.01); *B32B 2307/102* (2013.01); *B32B 2307/732* (2013.01); *E04B 2001/8461* (2013.01)

(58) Field of Classification Search
CPC .......... E04B 1/8409; E04B 2001/8461; E04B 1/8209; E04B 1/84; E04B 2001/8263; B32B 27/08; B32B 2307/102; B32B 2307/732; B32B 2307/56
See application file for complete search history.

(56) References Cited

U.S. PATENT DOCUMENTS

| | | | | |
|---|---|---|---|---|
| 8,474,194 B2* | 7/2013 | Tiramani | ............ | E04B 1/3442 |
| | | | | 52/79.8 |
| 2013/0087409 A1* | 4/2013 | Payot | .................. | G10K 11/168 |
| | | | | 427/256 |
| 2021/0229400 A1* | 7/2021 | Milliman | ................ | B32B 15/20 |

* cited by examiner

*Primary Examiner* — Maria V Ewald
*Assistant Examiner* — Daniel P Dillon

(57) ABSTRACT

An acoustic interlayer that includes a viscoelastic membrane layer, and at least one carrier material. The acoustic interlayer is easily installed at a location between two constraining layers, such as flooring, sheetrock, or the like.

3 Claims, 8 Drawing Sheets

ACOUSTIC INTERLAYER

CROSS REFERENCE TO RELATED APPLICATIONS

This application claims priority to Provisional Application Ser. No. 62/784,418 filed on Dec. 22, 2018, which is incorporated herein in its entirety.

BACKGROUND

Often there is a need for a breathable acoustic interlayer that can be used in construction.

The acoustic interlayer can be used in home construction, building construction, or heavy construction. The acoustic interlayer can be used to help keep unwanted sound or vibration from entering the interior of the building, between common walls and subfloors such as a house, office, manufacturing plant, or the like.

DESCRIPTION

Figure 1:
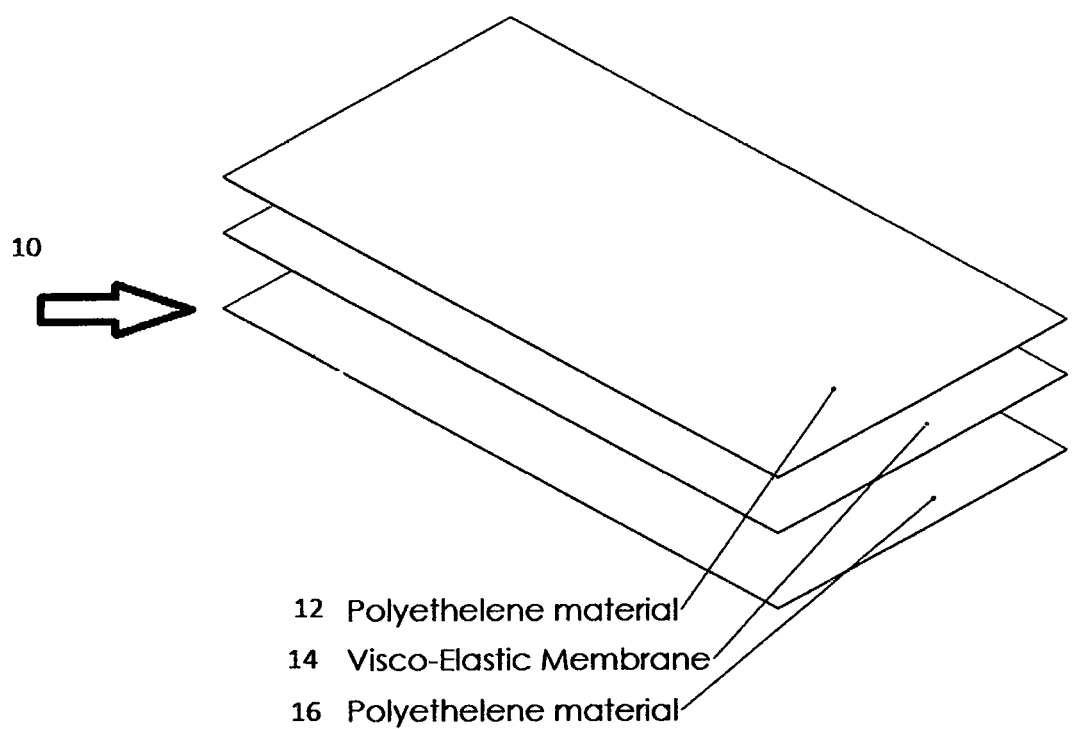
FIG. 1 depicts an embodiment of the acoustic interlayer.

With reference to FIG. 1 depicts acoustic interlayer 10 that has a first carrier layer 12, a viscoelastic membrane layer 14, and a second carrier layer 16.

The first carrier layer 12 can be various materials, polyethylene, nonwoven, paper, foil or film. Referred to as carrier layer. For example, the first carrier layer 12 can be Tyvek™, Barricade™, Nomex™, metal foil, paper or other films. The first carrier layer 12 can have a thickness from about .001 to .025. For example, the first polyethylene material layer 12 can have a thickness of .001 inches, .0025 inches, .0059 inches, .010 inches or .025 inches.

The viscoelastic membrane layer 14 can include any viscoelastic material. For example, the viscoelastic membrane layer can be Water based Acrylic, Solvent based Acrylics, Silicone, or Butyl products. The viscoelastic layer can have a thickness of about .001" to about .025". For example, the viscoelastic layer can have a thickness of about .001 inches, .0025 inches, .0059 inches, .010 inches or .025 inches The second carrier layer 16 can be various materials. For example, the second carrier layer 16 can be Tyvek™, Barricade™, Nomex™, Metal Foil or other films. The second carrier layer 16 can have a thickness from about .001 inches to .025 inches. For example, the second carrier material layer 16 can have a thickness of .001 inches, .0025 inches, .0059 inches, .010 inches, or .025 inches.

The carrier layers can sandwich the viscoelastic membrane layer 14. The thickness of the carrier layers can be from 1-1 to about or about 20-1. For example, each of the carrier layers can have a thickness of .006 inches, and the viscoelastic membrane layer can have a thickness of .006 inches. The layers can be connected by an adhesive, stitching, or staples to form the acoustic interlayer 10.

Figure 2:
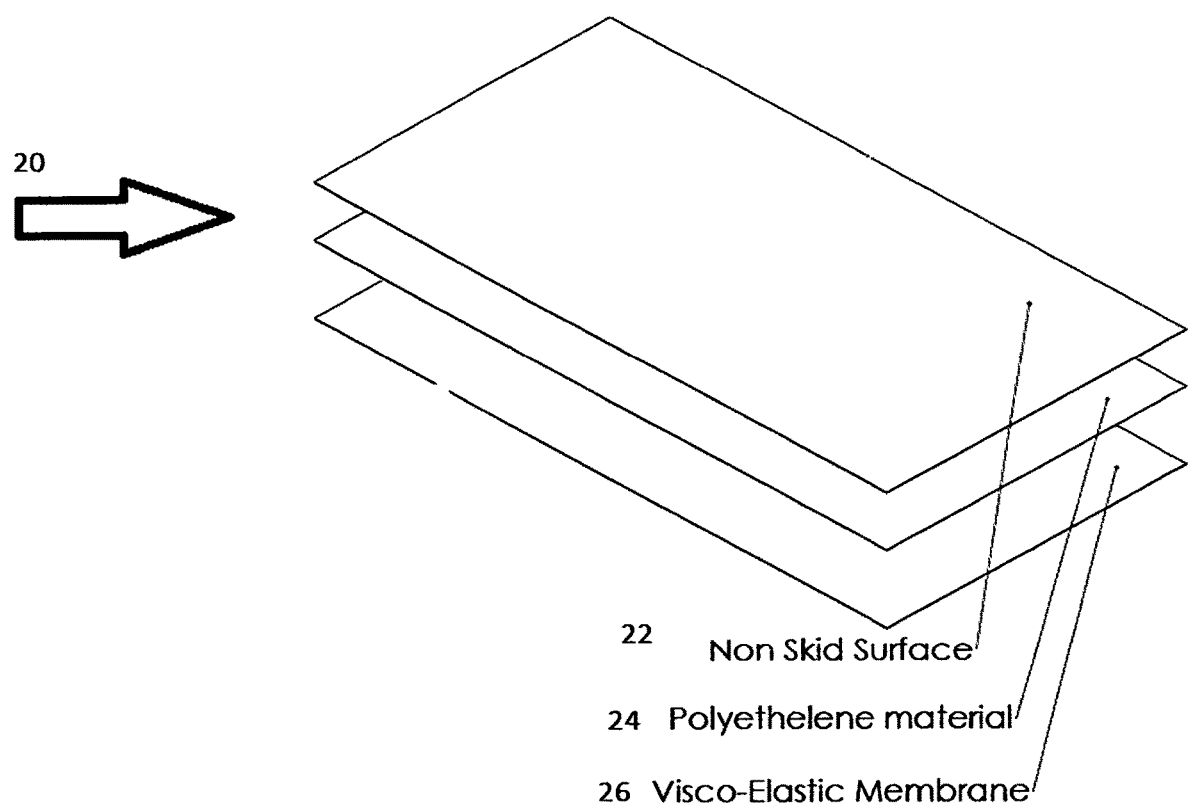
FIG. 2 depicts another embodiment of an acoustic interlayer.

FIG. 2 depicts another embodiment of an acoustical interlayer. The acoustic wrap 20 can include a first carrier layer that can have an embossed or non-skid surface treatment 22, that can consist of a Non-Skid Coating material layer 24.

The non-skid surface layer 22 can include Krylon™ Non-Skid spray, or embossing the surface of the carrier layer. The non-skid surface treatment 22 can be any non-skid surface material. The non-skid surface layer 22 can have a thickness of from about .001 inches to about .010 inches. For example, the non-skid surface layer 22 can have a thickness of .0005.001, .002.005, or .010 inches.

The second carrier layer 24 can be any polyethylene material, nonwoven paper, foil or film. For example, the polyethylene material layer 24 can be .001 inches, .0025 inches, .0059 inches, .010 inches, or .025". The carrier layer 24 can have a thickness from about .001 to about .005. For example, the carrier layer 24 can have a thickness of .001 inches, .0025 inches, .0059 inches .010 inches, or .025 inches The viscoelastic membrane layer 26 can include any viscoelastic material. For example, the viscoelastic membrane layer 26 can be Water based, Acrylic, Solvent based Acrylics, Silicon, or Butyl rubber. The viscoelastic membrane layer 26 can have a thickness of from about .001 inches to about .025 inches. For example, the viscoelastic membrane layer 26 can have a thickness of .001 inches, .0025 inches, .0059 inches, .010 inches, or .025 inches.

The thickness of the viscoelastic membrane layer 26 can be about .001 inches to about .025 inches, the carrier material layer 24 and the thickness of the non-skid surface can be from about .001 inches to about .010 inches. For example, the viscoelastic membrane layer 26 can have a thickness of .0059 inches, the carrier layer 24 can have a thickness of .0059 inches, and the non-skid surface can have a thickness of .002, thereby providing a ratio of 1.05/1.

Figure 3:
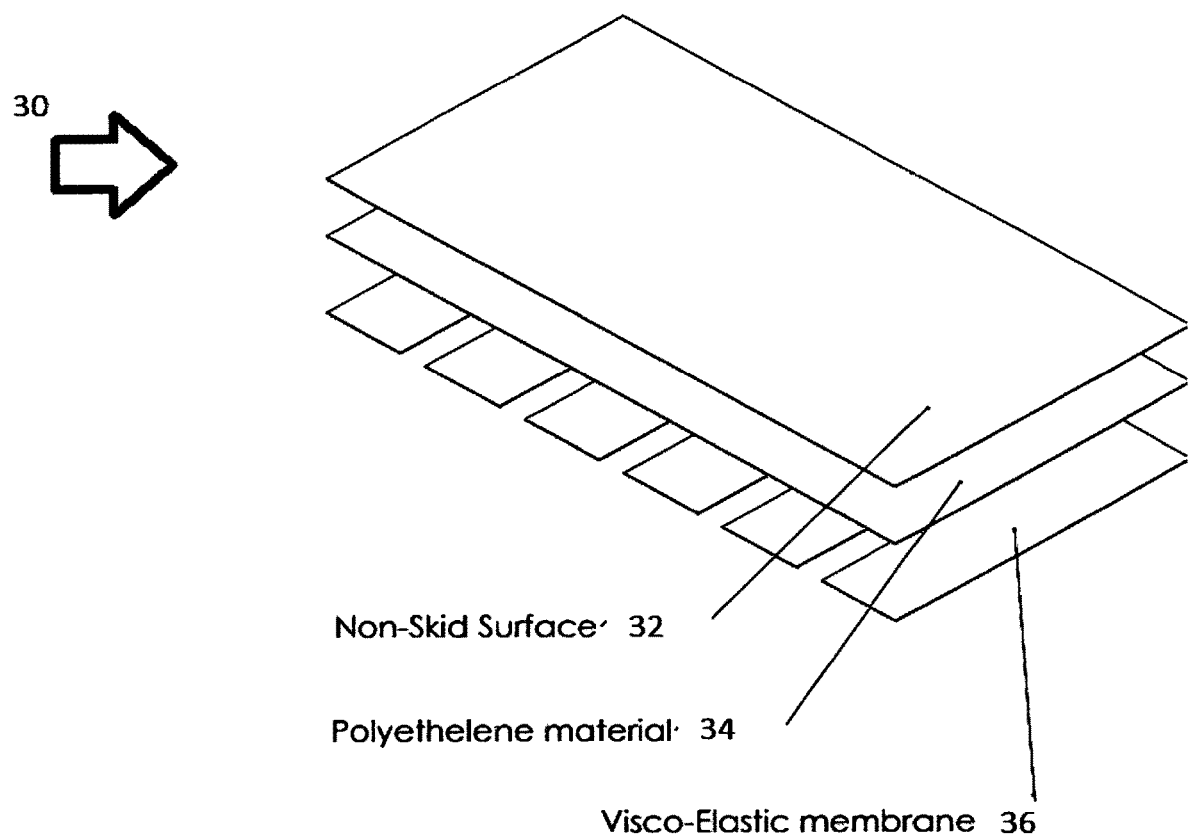
FIG. 3 depicts another embodiment of an acoustic interlayer.

FIG. 3 depicts another embodiment of an acoustic interlayer.

The acoustic interlayer 30 can include first carrier layer 32, which can have a non-skid surface. A second carrier 34 that can be a polyethylene material, and visco-elastic membrane 36.

The thickness can be as described herein. The viscoelastic membrane 36 can include several visco-elastic strips, and the visco-elastic strips can be spaced from one another by 5 inches, 10, 16 inches, 20 inches, or other spacing. For example, the spacing between the strips can be from about 1 inch to about 45 inches.

In one or more embodiments, the acoustic Interlayer is designed to be laminated in between or bonded to sheetrock, OSB, Plywood, Metal Siding, Engineered Flooring, Ceramic Tile, Hardwood, Plastic, or Composite building Materials. To improve sound transmission class (STC), impact insulation class (IIC) and reduce re-radiated noise as a result of structure borne vibration.

In one or more embodiments, the acoustical Interlayer can be a breathable moisture barrier. For example, the viscoelastic membrane can be arranged as strips and there can be non-adhesive areas between the strips allowing for the interlayer to be breathable.

In one or more embodiments, the acoustical Interlayer can be breathable interlayer and act as a rain screen. For example, the embodiment as described in FIG. 3 can be placed about an out side of the house between plywood and siding. Allowing for a space to allow moisture to escape from between the plywood and siding.

Figure 4:
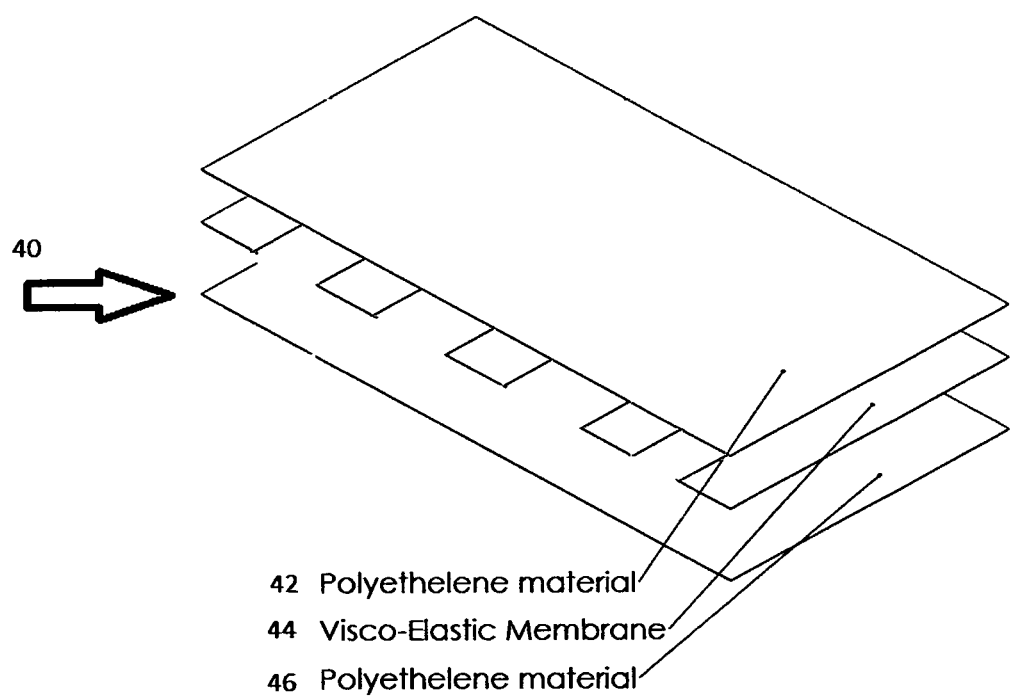
FIG. 4 depicts another embodiment of an acoustic interlayer.

FIG. 4 depicts another embodiment of an acoustic interlayer.

The acoustic interlayer 40 can include a first carrier layer 42, a visco-elastic membrane layer 44, and a second carrier layer 46. The carrier layers can be polyethelene material.

The visco-elastic membrane layer 44 can include a plurality of strips that are spaced from one another. The spacing between the strip of the viscoelastic membrane layer can be from about 1 inch to about 45 inches. For example, the strips can be spaced from one another by about 5 inches, about 10 inches, about 16 inches, about 30 inches, or about 45 inches.

In one or more embodiments, the interlayer can be used in construction the interlayer would be attached to a first layer of sheet rock, then a second layer of sheet rock would be applied about the interlayer. The first layer of sheet rock would can have a thickness of .5 inches, the interlayer can have a total thickness of .018 inches, and the outer sheet rock layer would have a thickness of .5 inches. The interlayer can comprises from about 1 percent of the total thickness of the two sheet rock layers and interlayer connected together.

In operation, the acoustic interlayer is disposed between two carrier layers which can be sheetrock, flooring, or other material. For example, the first carrier layer can be installed on a first piece of sheet rock installed on a wall, and the second carrier layer can be another sheet of sheet rock that is installed on the second carrier layer.

In one or more embodiments, the interlayer can be integrated with sheetrock. For example, one or more of the interlayers described herein can be adhered to the paper that sheetrock is cast to during manufacturing. In one or more embodiments, sheetrock slurry can be applied to the paper, and then the acoustic membrane can be applied to the slurry and then another layer of slurry can be placed about acoustic membrane.

In another embodiments, the interlayer can be cast in the middle of Sheetrock, OSB, Plywood, fiber glass, other construction material, or concrete during manufacturing. For example, a first layer of fiber glass or other construction material can be set out and then the visco-elastic membrane can be applied to the first layer, and then a second layer can be applied about the visco-elastic membrane.

In one embodiment, the acoustic interlayer is installed by putting a layer of construction material, such as sheet rock, subflooring, or the like, onto a surface to be acoustically dampened, to provide a first support. Then the acoustic interlayer is rolled out on the first support, and then the acoustic interlayer is pinned in place, and a second construct material, such an outer sheetrock layer or outer flooring is installed about the acoustic inner layer. Adhesive or the like can be used instead of a pin.

Figure 5:
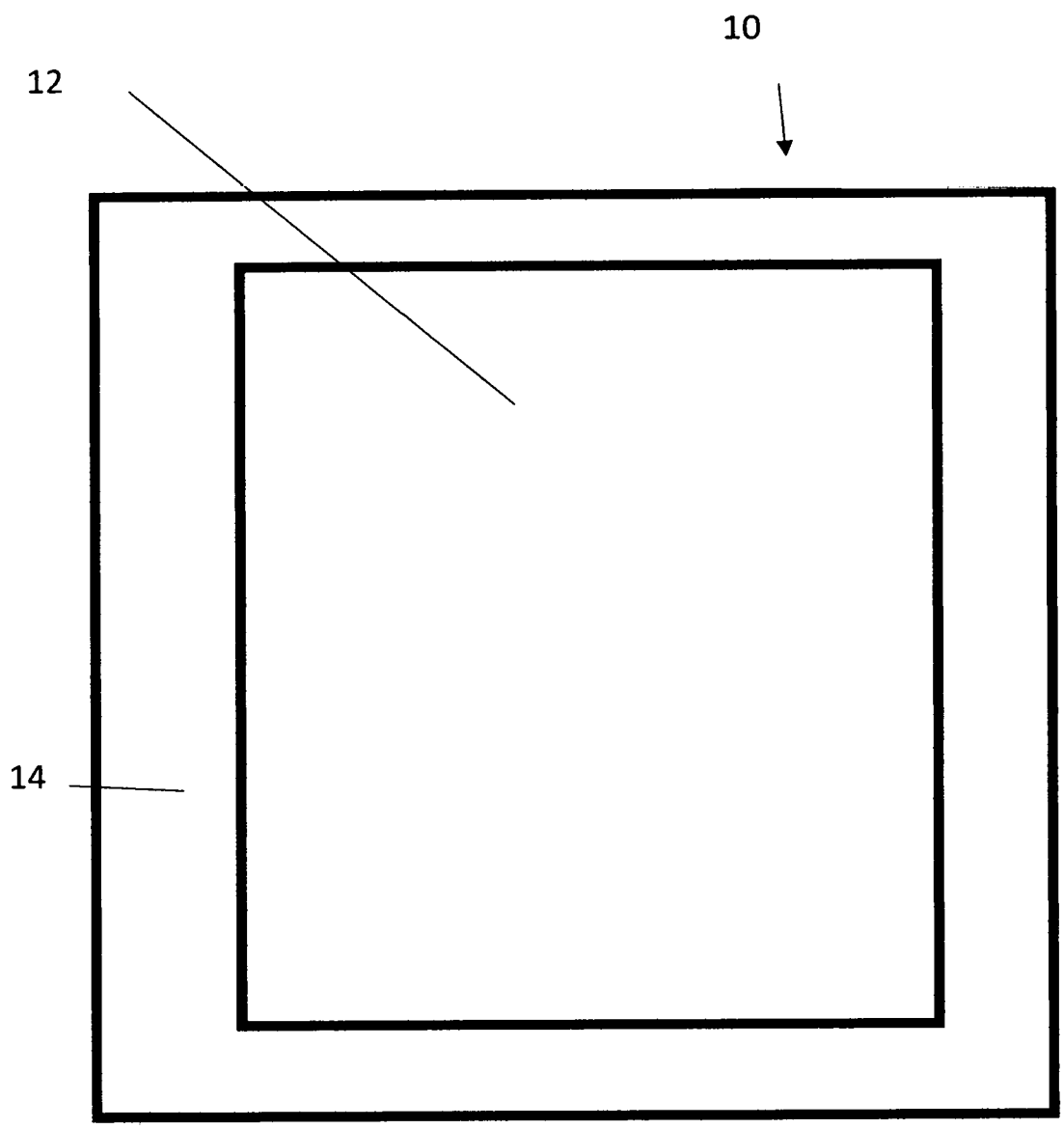
FIG. 5 depicts a blank canvas in a frame.
Figure 6:
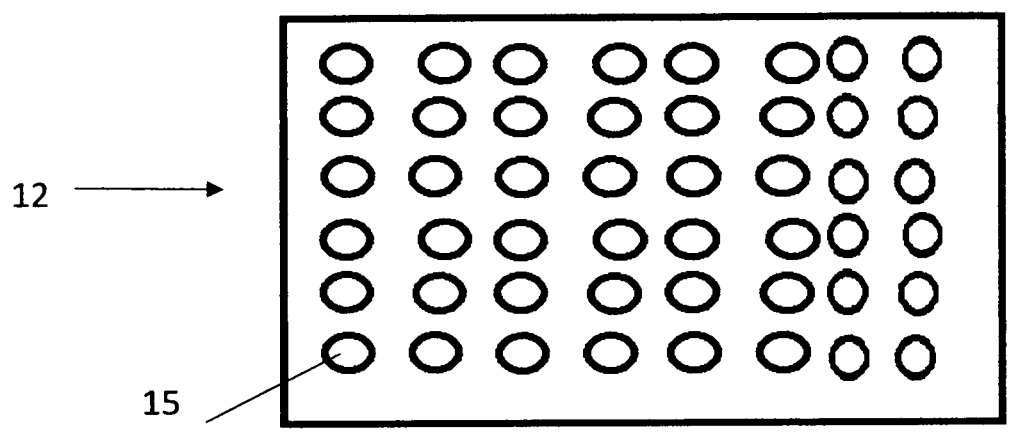
FIG. 6 depicts a close up of the blank canvas.
Figure 7:
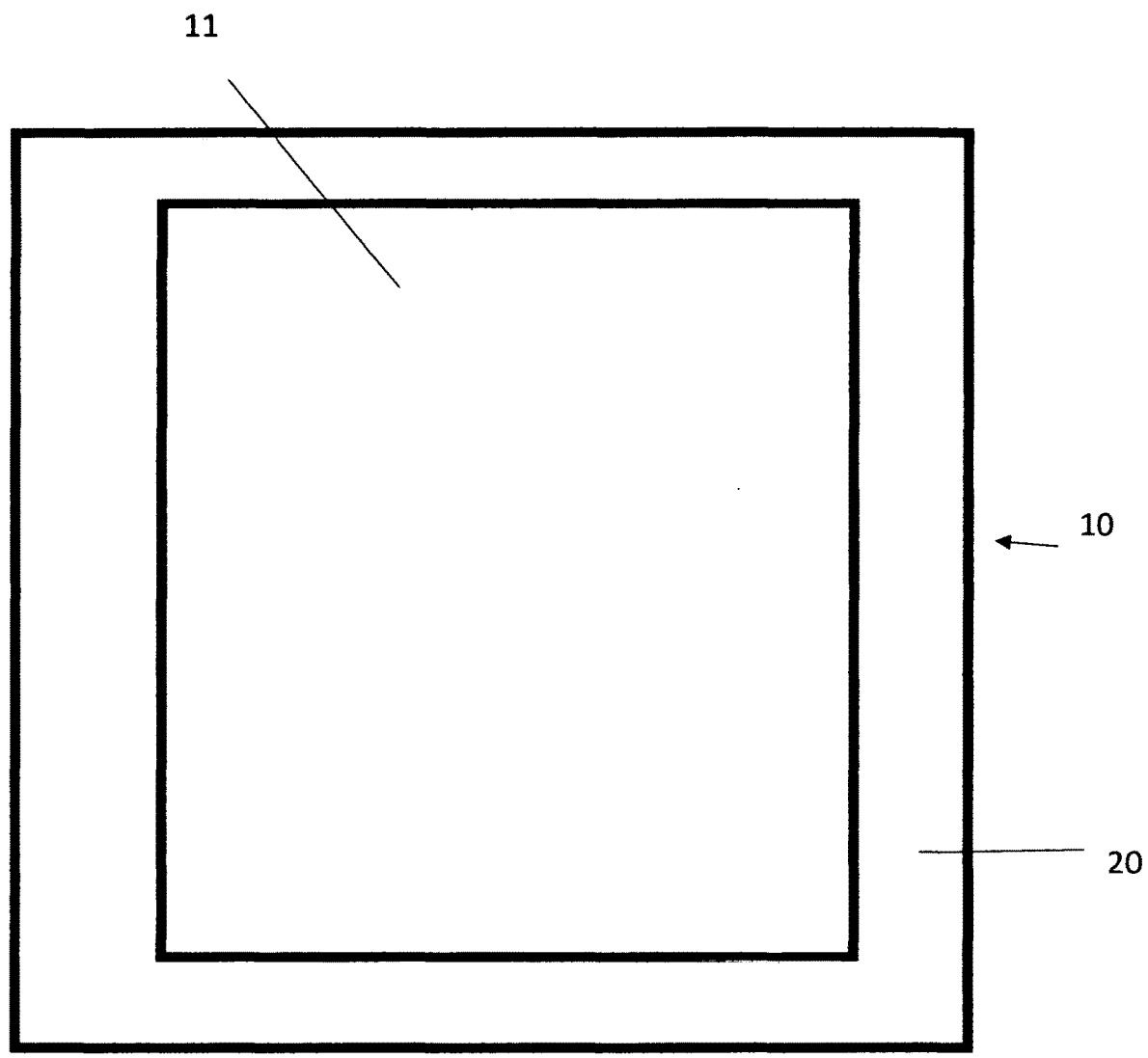
FIG. 7 depicts a back of the canvas.
Figure 8:
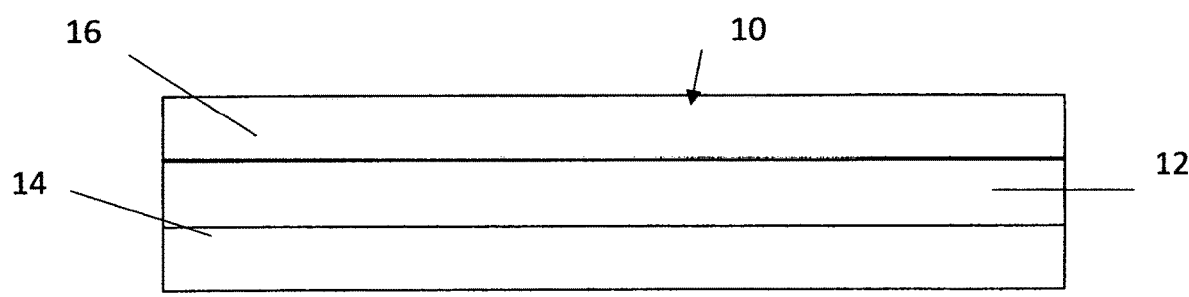
FIG. 8 depicts a side view of a completed ballistic shield.

With reference to FIG. 5 and FIG. 6, FIG. 5 depicts a blank canvas in a frame and FIG. 6 depicts a closeup of the canvas to show open spaces. The ballistic art shield 10 can have a frame 14 that has the canvas 12 operatively connected therewith. The art canvas can have an open area 15. FIG. 7 depicts a back of the canvas, and FIG. 8 depicts a side view of a completed ballistic shield. The frame 14 can have a top back of the frame 20. A space can be formed between the back of canvas 11 and top back of the frame 20. The ballistic backing 16 when placed on the frame can trap air in the space between the back of canvas 11 and top back of the frame 20. The air trapped in the space will provided acoustic absorption.

Although the present disclosure herein has described particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present claims. For example, while the disclosure has been in terms of a pair of swimming goggles, it will be understood that other goggles, for example, skiing goggles, snow goggles, and diving goggles, may also be made using the principles and the components described herein and are deemed to within the scope of the disclosure.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. An acoustic interlayer comprising:
a viscoelastic membrane layer, wherein the viscoelastic membrane layer has a thickness of from .001 inches to .0025 inches, and wherein the viscoelastic membrane layer comprises a plurality of viscoelastic strips, wherein the distance between each and every consecutive viscoelastic strip in the plurality of viscoelastic strips is 20 inches, and wherein spaces between the plurality of viscoelastic strips comprises non-adhesive areas;
a first carrier layer, wherein the thickness of the viscoelastic membrane layer and the first carrier layer is at least .005 inches; and
a second carrier layer having a thickness from .001 inches to .025 inches, wherein the viscoelastic membrane layer is disposed between the first carrier layer and the second carrier layer, wherein first carrier layer and second carrier layer comprise a polyethylene material.

2. A building structure comprising:
a. a first constraining layer;
b. an acoustic interlayer consisting of,
a viscoelastic membrane layer, wherein the viscoelastic membrane layer has a thickness of from 0.001 inches to 0.0025 inches, and wherein the viscoelastic membrane layer comprises a plurality of viscoelastic strips, and wherein the distance between each and every consecutive viscoelastic strip in the plurality of viscoelastic strips is 16 inches, and wherein spaces between the strips comprises non-adhesive areas,
a first carrier layer, wherein the thickness of the viscoelastic membrane layer and the first carrier layer is at least .005 inches; and
a second carrier layer having a thickness from .001 inches to .025 inches, wherein the viscoelastic membrane layer is disposed between the first carrier layer and the second carrier layer, wherein first carrier layer and second carrier layer comprises a polyethylene material; and
c. a second constraining layer.

3. An acoustic interlayer comprising:
a viscoelastic membrane layer, wherein the viscoelastic membrane layer has a thickness of from 0.001 inches to 0.0025 inches, and wherein the viscoelastic membrane layer comprises a plurality of viscoelastic strips, and wherein the distance between each and every consecutive viscoelastic strip in the plurality of viscoelastic strips is 5 inches, and wherein spaces between the viscoelastic strips comprise non-adhesive areas, a first carrier layer, wherein the thickness of the viscoelastic membrane layer and the first carrier layer is at least .005 inches;
a second carrier layer having a thickness from about .001 inches to .025 inches, wherein the viscoelastic membrane layer is disposed between the first carrier layer and the second carrier layer, wherein first carrier layer and second carrier layer comprise a polyothviene polyethelene material; and
a non-skid surface, located on the second carrier layer on a side opposite the viscoelastic membrane layer, and wherein the non-skid surface has a thickness of .002 inches.

* * * * *